(12) United States Patent
Kagaya et al.

(10) Patent No.: US 12,307,816 B2
(45) Date of Patent: May 20, 2025

(54) INFORMATION PROCESSING DEVICE, INFORMATION PROCESSING METHOD, AND PROGRAM

(71) Applicant: Panasonic Intellectual Property Management Co., Ltd., Osaka (JP)

(72) Inventors: Tomoyuki Kagaya, Kanagawa (JP); Yuusuke Hara, Kanagawa (JP); Yosuke Nozue, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 340 days.

(21) Appl. No.: 17/927,291

(22) PCT Filed: Feb. 9, 2021

(86) PCT No.: PCT/JP2021/004731
§ 371 (c)(1),
(2) Date: Nov. 22, 2022

(87) PCT Pub. No.: WO2021/240903
PCT Pub. Date: Feb. 12, 2021

(65) Prior Publication Data
US 2023/0206688 A1    Jun. 29, 2023

(30) Foreign Application Priority Data
May 29, 2020   (JP) ................................. 2020-094284

(51) Int. Cl.
G06V 40/16   (2022.01)
(52) U.S. Cl.
CPC .......... *G06V 40/173* (2022.01); *G06V 40/166* (2022.01); *G06V 40/168* (2022.01)

(58) Field of Classification Search
CPC .. G06V 40/173; G06V 40/166; G06V 40/168; G06V 20/52; G06V 40/1365;
(Continued)

(56) References Cited

U.S. PATENT DOCUMENTS

| | | | |
|---|---|---|---|
| 2009/0089588 A1* | 4/2009 | Adrangi | G06F 21/32 726/19 |
| 2014/0123275 A1* | 5/2014 | Azar | G06V 10/772 726/19 |

(Continued)

FOREIGN PATENT DOCUMENTS

| | | |
|---|---|---|
| EP | 2759958 | 7/2014 |
| JP | 2007-249298 | 9/2007 |

(Continued)

OTHER PUBLICATIONS

International Search Report issued in International Patent Application No. PCT/JP2021/004731, dated May 11, 2021, along with an English translation thereof.

(Continued)

*Primary Examiner* — Nimesh Patel
(74) *Attorney, Agent, or Firm* — Greenblum & Bernstein, P.L.C.

(57) ABSTRACT

An information processing device is equipped with: an authentication circuit that authenticates a person on the basis of a facial image of the person in captured image data; and a control circuit that controls the order of re-authentication of a plurality of people for which authentication failed, on the basis of information pertaining to attributes related to temporal changes in facial images.

9 Claims, 8 Drawing Sheets

(58) Field of Classification Search
CPC .... G06V 10/761; G06V 40/172; G06V 40/70; G06V 40/161; G06V 20/46; G06V 40/13; G06V 40/197; G06V 40/171; G06V 40/16; G06V 10/764; G06V 40/165; G06V 20/47; G06V 10/762; G06F 18/24; G06F 18/253; G06F 21/32; G06F 21/31; G06F 2221/2139; G06F 18/22; G06F 3/017; G06F 3/013; G06F 18/214; G06F 21/00; G06F 18/217; G06F 21/30; G06F 21/88; G06F 21/6245; G06F 21/62; G06F 2221/2113; G06F 2221/2137; H04N 23/611; H04W 12/06; H04W 12/08; H04W 12/12; H04W 12/30; H04W 12/065; H04W 12/35; H04M 1/724631; H04M 1/72463; H04M 1/72454; H04M 2250/12; H04M 2250/52; H04M 1/72457; G06N 3/045; G06N 20/00; G06N 3/04; G06N 3/044; G06N 3/0464; G06N 3/08
See application file for complete search history.

(56) References Cited

U.S. PATENT DOCUMENTS

| | | | |
|---|---|---|---|
| 2014/0205157 A1* | 7/2014 | Suzuki | G06V 10/50 382/118 |
| 2019/0050631 A1 | 2/2019 | Hayase et al. | |
| 2020/0026836 A1* | 1/2020 | Cho | G06V 40/70 |
| 2020/0089937 A1* | 3/2020 | Tseng | G06V 40/172 |
| 2022/0044221 A1* | 2/2022 | Ueki | G06Q 20/40145 |

FOREIGN PATENT DOCUMENTS

| | | |
|---|---|---|
| JP | 2008-234578 | 10/2008 |
| JP | 2014-67315 | 4/2014 |
| WO | 2017/146160 | 8/2017 |
| WO | 2019/181479 | 9/2019 |

OTHER PUBLICATIONS

Extended European Search Report issued in European Patent Application No. 21814051.5, dated Nov. 2, 2023.

* cited by examiner

INFORMATION PROCESSING DEVICE, INFORMATION PROCESSING METHOD, AND PROGRAM

TECHNICAL FIELD

The present disclosure relates to an information processing apparatus, an information processing method, and a program.

BACKGROUND ART

For example, an authentication system has been studied of performing face authentication on a large number of unspecified persons (e.g., see Patent Literature (hereinafter referred to as "PTL") 1).

CITATION LIST

Non Patent Literatures

PTL 1
WO 2019/181479

SUMMARY OF INVENTION

However, the authentication system of PTL 1 is a system for face authentication of a stationary person such as a seated person at a table, and there is scope for further study on a method for enhancing the efficiency of authentication in an environment in which people move.

One non-limiting and exemplary embodiment of the present disclosure facilitates providing an information processing apparatus, an information processing method, and a program each capable of enhancing the efficiency of authentication in an environment in which people move.

An information processing apparatus according to an exemplary embodiment of the present disclosure includes: authentication circuitry, which, in operation, performs authentication on a person based on a face image of the person in captured image data; and control circuitry, which, in operation, controls an order of re-authentication on a plurality of persons for whom the authentication has failed, based on information on an attribute related to a time change of the face image.

It should be noted that general or specific embodiments may be implemented as a system, an apparatus, a method, an integrated circuit, a computer program, a storage medium, or any selective combination thereof.

According to an exemplary embodiment of the present disclosure, it is possible to enhance the efficiency of authentication in an environment in which people move.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with reference to the accompanying drawings.

For example, an authentication system has been studied for performing face authentication and identifying people in an area where large number of people move (or pass through) such as outdoors, an office, a commercial facility, and/or a public facility. Such an authentication system may be used, for example, in a system for identifying a person, such as an entry and exit management system and/or a security system.

Further, for example, in a case where face authentication on a certain person fails in an authentication system, it is expected that the number or percentage of persons who are successfully authenticated increases and authentication efficiency is thus enhanced by performing the face authentication again (or may also be referred to as re-authentication) on the person. For example, when a cause of a failure of the face authentication is temporary masking or change in a face, the cause may be resolved by performing re-authentication at a different timing from that of the failure.

However, in an environment in which people move as described above, at the time when the authentication system performs re-authentication on a person for whom the face authentication has failed, the person subject to the re-authentication may move out of an area where the face authentication is performed (hereinafter referred to as "authentication area"). In this case, the authentication system cannot perform the re-authentication on the person having moved out of the authentication area, and thus, the authentication efficiency may be reduced.

Thus, an exemplary embodiment of the present disclosure will describe a method for enhancing the authentication efficiency in an authentication system in an environment in which people move. In an exemplary embodiment of the present disclosure, for example, a description will be given of a method of determining, in an authentication system, the order in which re-authentication is performed (e.g., referred to as "priority order") when a plurality of persons subject to the re-authentication (i.e., person for whom authentication has failed) is present.

[Configuration of Information Processing System]

Figure 1:
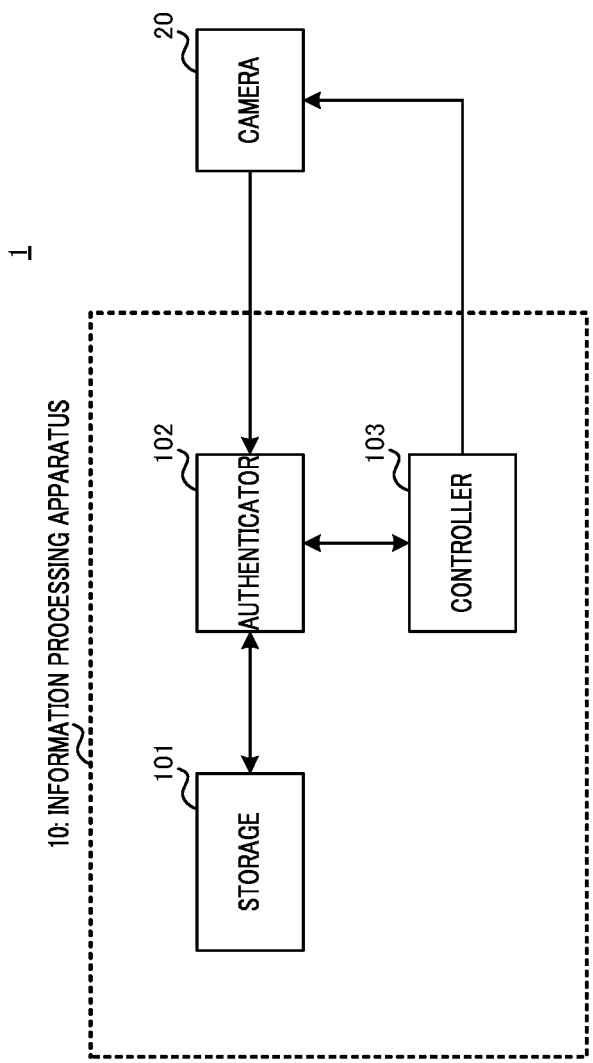
FIG. 1 illustrates a configuration example of an authentication system.

FIG. 1 illustrates a configuration example of authentication system 1 according to the present embodiment.

Authentication system 1 illustrated in FIG. 1 includes, for example, information processing apparatus 10 and camera 20. Information processing apparatus 10 and camera 20 may be connected via a communication network, such as a wireless network or a wired network, for example.

Information processing apparatus 10 may perform face authentication processing based on, for example, image data acquired from camera 20. Information processing apparatus 10 may also perform re-authentication on a face image of a person for whom the face authentication has failed (e.g., may also be referred to as face authentication-failed person), for example. Information processing apparatus 10 may, for example, determine the order in which re-authentication is performed for face images of face authentication-failed persons (e.g., priority order) and perform the re-authentication according to the determined priority order.

Camera 20 may transmit image data captured in an authentication area to information processing apparatus 10.

Camera 20 may be installed, for example, to include an authentication area in an imaging region (or referred to as imaging range). Alternatively, camera 20 may determine the imaging region so that a plurality of regions obtained by dividing the authentication area is imaged in order (i.e., imaging direction). Alternatively, camera 20 may be configured with a plurality of cameras and cover the authentication area with an imaging region of each of the plurality of cameras.

[Configuration Example of Information Processing Apparatus]

Information processing apparatus 10 illustrated in FIG. 1 may include, for example, storage 101, authenticator 102, and controller 103.

Storage 101 may store information on a person (e.g., person information), for example. In other words, storage 101 may include a database including the person information.

The person information may include, for example, information for identifying a person, such as an ID or person name, and registered image data of a pre-registered person (e.g., referred to as face image data). The person information may be, for example, customer information in a customer management system, employee information in an employee management system, information on a criminal or a suspicious person in a crime prevention system, or information on a person of another type.

Storage 101 may also store, for example, an identification model that is used for authentication in authenticator 102 (or also referred to as learned model). Storage 101 may store the identification model for each attribute (or type) of information (e.g., referred to as "quality score" or "priority level on re-authentication") related to the easiness of authentication in authenticator 102 (i.e., ease of authentication or the suitability and unsuitability for authentication), for example. The attribute of quality score may be, for example, an attribute related to a time change of a face image.

For example, the quality score may be based on a change in a feature according to time elapse of a face image.

For example, the attribute of quality score may include an attribute having a feature that is less likely to change with time (time elapse). An example of the feature that is less likely to change with time includes a feature which continuously masks or changes at least a portion of a person's face, such as a face mask, sunglasses, a hat, a beard, or a cosmetic (including, e.g., face paint).

In addition, the attribute of quality score may include, for example, an attribute having a feature that is likely to change with time. An example of the feature that is likely to change with time includes a feature which temporary masks or changes at least a portion of a person's face, such as a facial expression, a facial orientation, an eye closure, image blurring, lighting (e.g., low illuminance or backlight), or hair disturbance.

Storage 101 may store, for example, an identification model (e.g., identification model having learned face with sunglasses) for identifying at least one attribution of quality score in authenticator 102.

Authenticator 102 may perform face authentication on a person based on, for example, captured image data captured by camera 20 and person information stored in storage 101. Authenticator 102 may output, for example, information indicating an authentication result (e.g., person information on authenticated person or information on success or failure of authentication) to controller 103.

For example, authenticator 102 may perform the face authentication on a person based on a degree of similarity between face image data of a person previously registered in storage 101 and a face image in image data captured by camera 20. By way of example, the higher the degree of similarity the face image has with the registered face image data, the higher the information on the degree of similarity (hereinafter, referred to as "authentication score") may be set. Authenticator 102 may determine a person included in a face image data with an authentication score data equal to or greater than a threshold value as a person corresponding to the registered face image data, for example. Further, for example, authenticator 102 may perform the re-authentication on a face image of a person for whom the face authentication has failed (face authentication-failed person) in accordance with an indication from controller 103.

Controller 103 may control authentication processing in authenticator 102, for example. By way of example, controller 103 identifies a face authentication-failed person (or face image) based on the information input from authenticator 102. In a case where a plurality of face authentication-failed persons is present, controller 103 may control re-authentication on the plurality of face authentication-failed persons based on, for example, the quality score and the authentication score that is related to the degree of similarity in the face authentication. For example, controller 103 may determine the order in which re-authentication is performed on the face authentication-failed persons (e.g., referred to as priority order). Controller 103 may output, to authenticator 102, an indication for the re-authentication based on the determined priority order of the re-authentication, for example.

Controller 103 may also control an operation of camera 20. By way of example, controller 103 may determine an imaging region of camera 20 in an authentication area and indicate it to camera 20, based on a control result of re-authentication on a face authentication-failed person (e.g., priority order). Controller 103 may also control, for example, tracking (i.e., following or trailing) processing of camera 20 for a face image corresponding to the face authentication failed person.

[Configuration Example of Camera]

Figure 2:
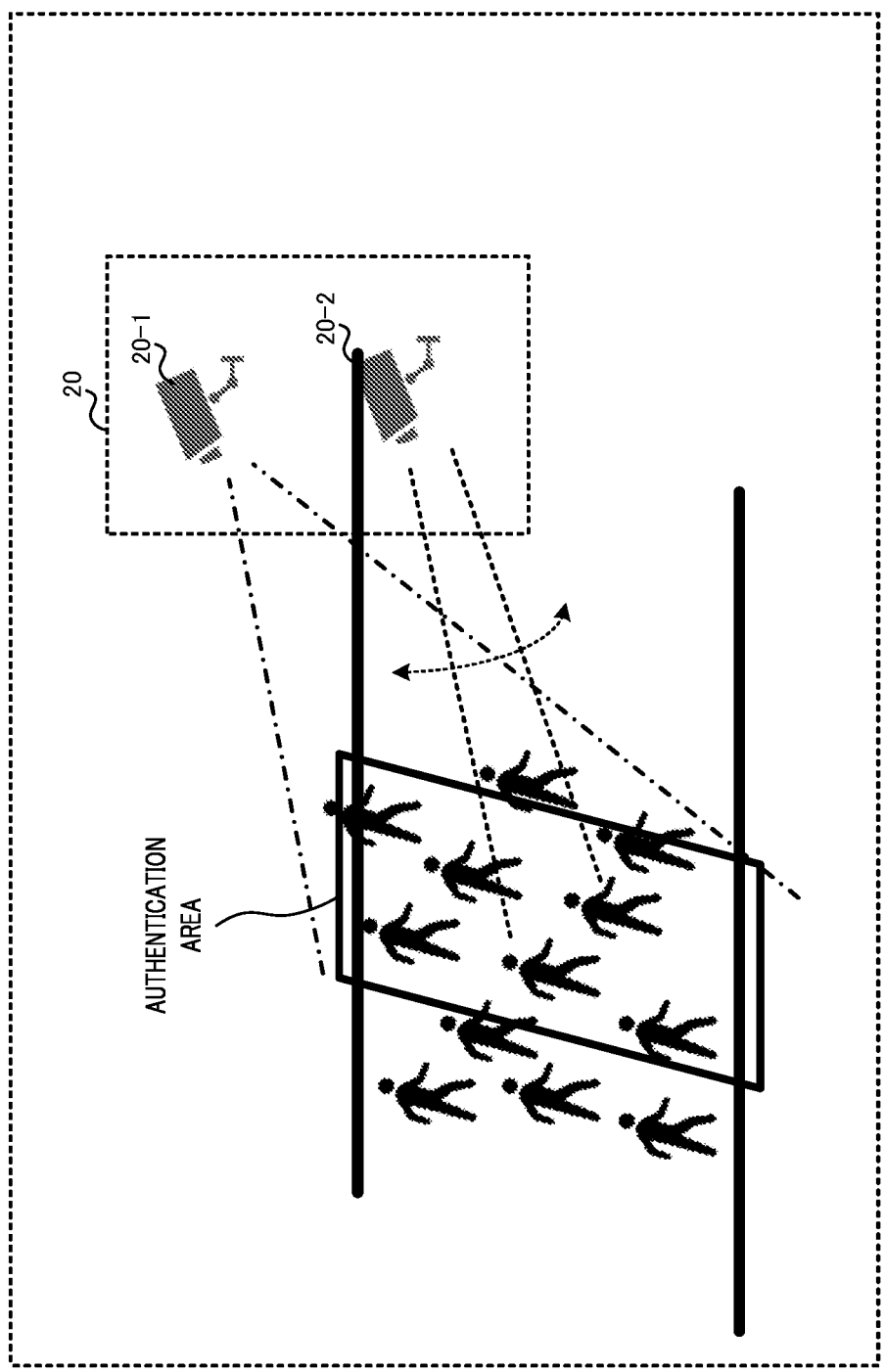
FIG. 2 illustrates an installation example of a camera.

FIG. 2 illustrates an installation example of camera 20 with respect to an authentication area.

In the example illustrated in FIG. 2, camera 20 may include, for example, camera 20-1 having a certain imaging region and camera 20-2 having an imaging region narrower than the imaging region of camera 20-1. Camera 20-1 may be, for example, a wide-field camera. Further, camera 20-2 may be, for example, a Pan-Tilt-Zoom (PTZ) camera.

Camera 20-1 may, for example, transmit image data obtained by capturing at least a partial area of the authentication area to information processing apparatus 10. In the following, as an example, imaging by camera 20-1 is referred to as "entire imaging," and an imaging region by camera 20-1 is referred to as "entire imaging area."

Camera 20-2 may, for example, transmit image data obtained by capturing a narrower range than the imaging region of camera 20-1 (or entire imaging area) to information processing apparatus 10. In the following, as an example, imaging by camera 20-2 is referred to as "individual imaging," and an imaging region by camera 20-2 is referred to as "individual imaging area."

Camera 20 (e.g., camera 20-1 and camera 20-2) may, for example, determine an imaging mode such as an imaging direction or a magnification in accordance with an indication from information processing apparatus 10 (e.g., controller 103 described later).

For example, in FIG. 2, information processing apparatus 10 may perform identification of a facial portion of a person (e.g., face image) in the authentication area and the tracking processing for the person (face image) in the authentication area, based on image data obtained by the entire imaging. Further, for example, information processing apparatus 10 may perform face authentication processing for the face image of the person, based on image data obtained by the individual imaging.

Incidentally, identification, tracking and face authentication for a person are not limited to the case based on image data acquired by different cameras and may be performed based on image data acquired from a single camera.

Further, a configuration of camera 20 is not limited to the configuration example illustrated in FIG. 2. For example, camera 20 may include a PTZ camera and may not include a wide-field camera. Further, camera 20 is not limited to a PTZ camera and may be a camera with a fixed imaging region. That is, as long as an entire imaging area and an individual imaging area are imaged, any type and number of cameras 20 can be assumed.

Further, data acquired by camera 20 may be either still image data or moving image data.

Figure 3:
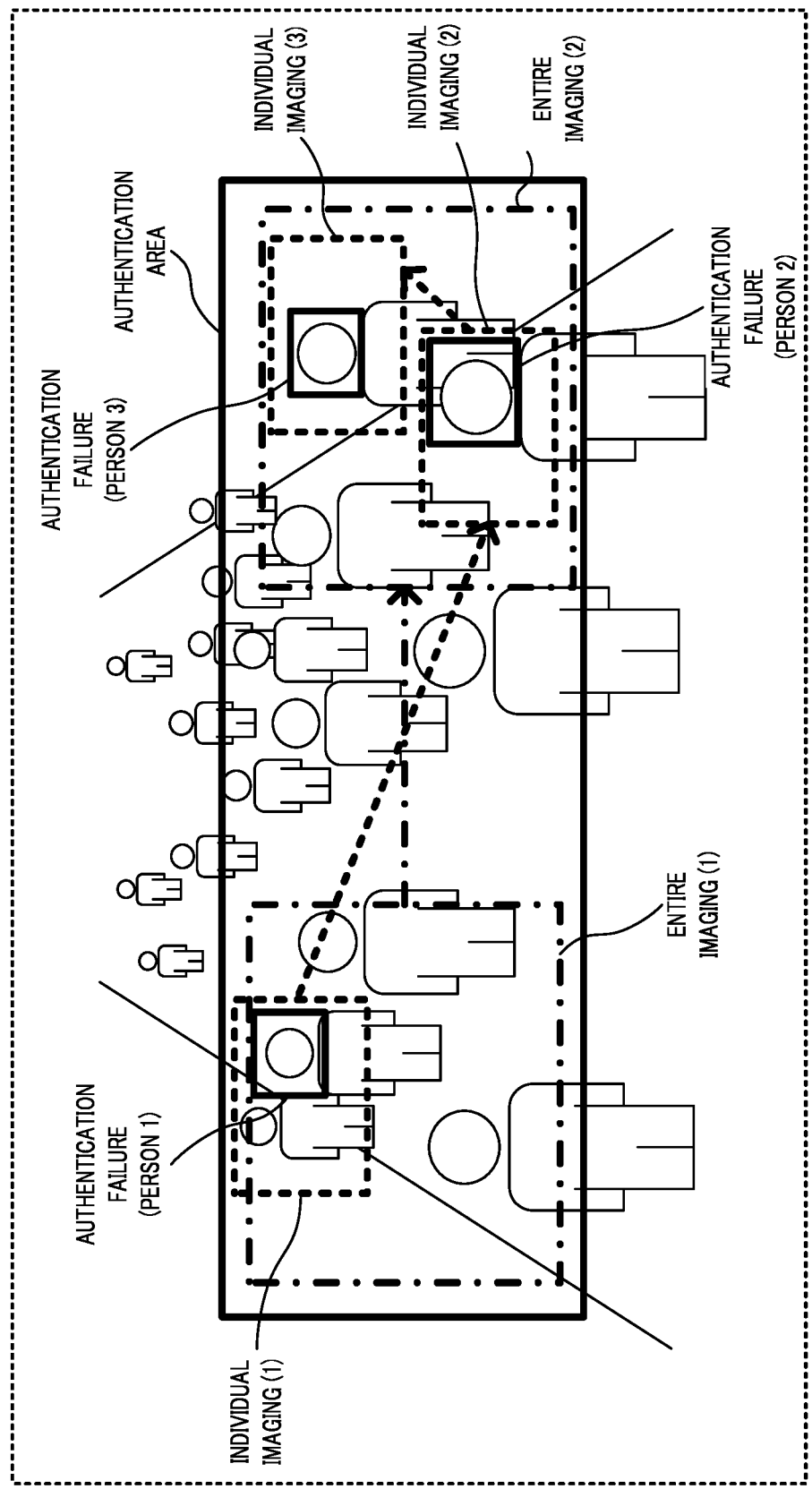
FIG. 3 illustrates an exemplary imaging region of the camera in an authentication area.

FIG. 3 illustrates, for example, a control example for the imaging region of camera 20 by information processing apparatus 10. FIG. 3 illustrates, as an example, a control example for the imaging region in the installation example of camera 20 illustrated in FIG. 2.

For example, as illustrated in FIG. 3, information processing apparatus 10 may switch, in the authentication area, the entire imaging area by camera 20 from an area of entire imaging (1) into an area of entire imaging (2). With this processing, information processing apparatus 10 may control, for example, the identification of a person and the tracking of a person in the authentication area. A switching method of the entire imaging area (e.g., switching order, switching direction, or region size) is not limited to the example illustrated in FIG. 3. For example, the entire imaging area may have a size similar to the authentication area.

Further, for example, as illustrated in FIG. 3, in the authentication area, information processing apparatus 10 may switch the individual imaging area by camera 20 between areas of individual imaging (1), individual imaging (2), and individual imaging (3) in this order. For example, in a case where the face authentication is not successful within a specified number of frames (or specified time) in a certain individual imaging area, information processing apparatus 10 may perform switching to an individual imaging area of the person subject to the next authentication. In one example, in a case where a face printed on a poster affixed to the background accidentally meets a characteristic having high priority order of re-imaging, an individual imaging area including the poster continues to take precedence over other individual imaging areas even though the possibility of successful face authentication is extremely low. In a case where the face authentication is not successful within a specified number of frames, switching to another individual imaging area can reduce the effect of such a situation even when it occurs. Meanwhile, in this case, information processing apparatus 10 may, for example, record the individual imaging area in which the face authentication is not successful within a specified number of frames as being excluded from subsequent re-authentication. This is because a poster and the like do not move and thus may be subject to the re-authentication again. Switching of imaging regions in the authentication area is not limited to the example illustrated in FIG. 3.

Information processing apparatus 10 may track, in the authentication area, face images of persons (e.g., person 1, person 2 and person 3 in FIG. 3) for whom the face authentication has failed, for example.

[Operation Example of Authentication System]

Next, an exemplary operation in authentication system 1 described above will be described.

Figure 4:
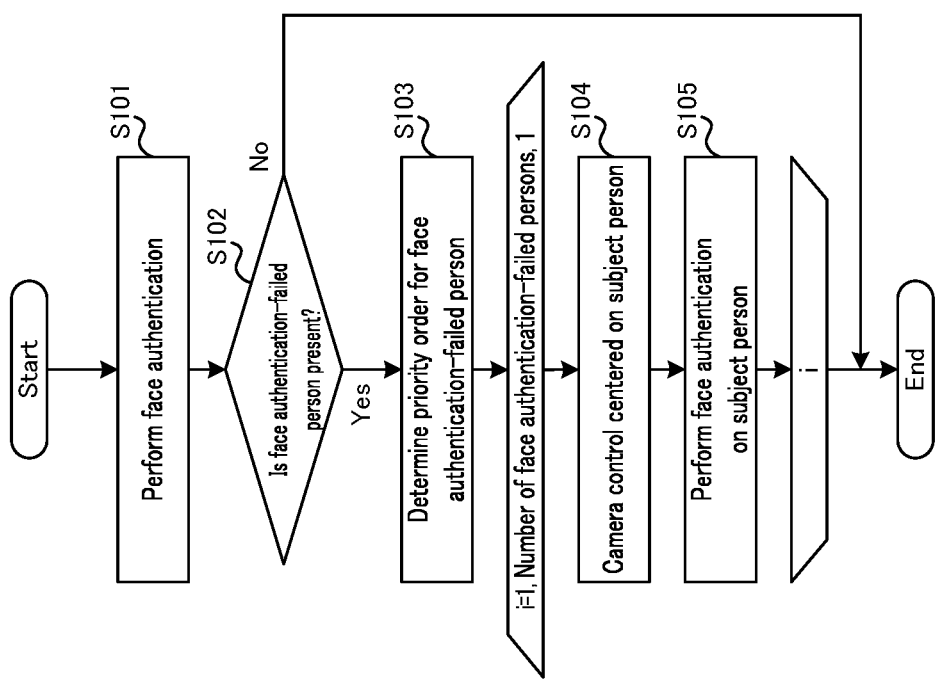
FIG. 4 is a flowchart indicating an operation example of the authentication system.

FIG. 4 is a flowchart indicating an operation example of authentication system 1.

Information processing apparatus 10, as described above, for example, performs the face authentication on a person based on a face image of the person in captured image data acquired from camera 20 (S101).

Information processing apparatus 10, for example, determines the presence or absence of a person for whom the face authentication has failed (e.g., face authentication-failed person), as a result of the face authentication (S102). Information processing apparatus 10 may count the number of face authentication-failed persons, for example.

In a case where a face authentication-failed person is not present (S102: No), information processing apparatus 10 may terminate the processing illustrated in FIG. 2 or return to the processing in S101, for example.

On the other hand, in a case where a face authentication-failed person is present (S102: Yes), information processing apparatus 10 may determine, for the face authentication-failed person, the priority order of the re-authentication, for example (S103). A determination example for the priority order of the re-authentication will be described later.

Information processing apparatus 10 may control camera 20 based on, for example, the determined priority order (S104). For example, information processing apparatus 10 may sequentially identify persons (or face images) subject to the re-authentication according to the priority order and control operations such as the imaging direction of camera 20 and the magnification (e.g., zooming) such that each of the persons subject to the re-authentication is at a center of an imaging region of camera 20.

Information processing apparatus 10 may perform the face authentication (i.e., re-authentication) based on, for example, image data obtained by capturing the person subject to the re-authentication by camera 20 (S105).

Information processing apparatus 10 may, for example, repeat the processing of the camera control in S104 and the face authentication in S105 for the number of persons for whom the face authentication has failed.

[Determination Method for Priority Order of Re-Authentication]

Next, a description will be given of an example of determining a priority order of the re-authentication on a person for whom the face authentication has failed (e.g., processing in S103 of FIG. 4).

Figure 5:
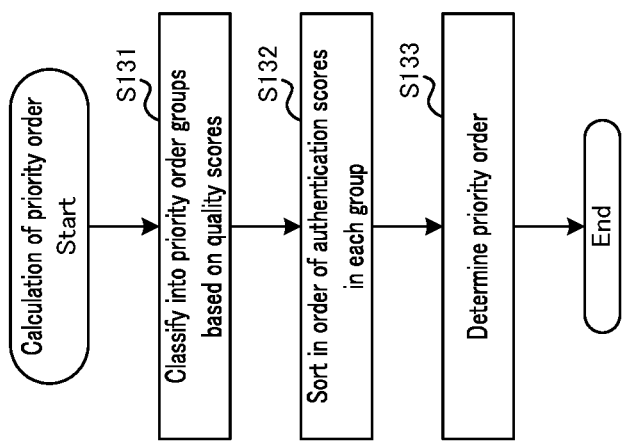
FIG. 5 is a flowchart indicating an example of determination processing for a priority order of re-authentication.

FIG. 5 is a flowchart illustrating an example of determination processing for a priority order of the re-authentication in information processing apparatus 10.

Information processing apparatus 10 may, for example, classify face authentication-failed persons into a plurality of groups based on a quality score (i.e., priority level on re-authentication) for each of face images of face authentication-failed persons (S131).

The "quality score" may be, for example, information on an attribute related to a time change in the face image. In addition, for example, the quality score may be information on the easiness of face authentication (or ease of face authentication) for the face image. For example, for a face image having a higher possibility of successful face authentication, a higher quality score (i.e., weight for attribute of face image) may be set.

For example, the quality score may be determined based on a change in a feature according to time elapse of a face image. In one example, the quality score may be determined based on a feature of the face image, such as a facial expression, a facial orientation, an eye closure, image blurring, and a lighting condition, as well as may be determined based on the presence or absence of a feature in the face image, such as a face mask, sunglasses, a hat, a beard, and a cosmetic.

For example, a feature of a face image such as a facial expression, a facial orientation, an eye closure, image blurring, and a lighting condition can be referred to as a feature that is likely to change with time (or feature that is temporarily apparent). In one example, a person may be smiling at a certain timing when passing through the authentication area, whereas he/she may be expressionless at a different timing. For example, in a case where a face image of a face authentication-failed person includes the feature that is likely to change as described above (hereinafter, may be referred to as a changeable feature), a feature that facilitates successful face authentication may be included at the different timing (i.e., feature likely to change may not be included).

On the other hand, for example, a feature of a face image, such as a mask, sunglasses, a hat, a beard, and a cosmetic, can be referred to as a feature that is less likely to change with time (or feature that is continuously apparent). In one example, a person wearing a face mask at a certain timing when passing through the authentication area is highly likely to wear the face mask at a different timing. For example, in a case where a face image of a face authentication-failed person includes the feature that is less likely to change as described above (hereinafter, may be referred to as a less changeable feature), there is a high possibility that a feature that tends to fail face authentication even at the different timing is included.

Thus, information processing apparatus 10 may, for example, set a quality score (i.e., weight) for a face image including the feature that is likely to change with time higher than a quality score for a face image including the feature that is less likely to change with time.

Further, a face image having neither the changeable feature nor the less changeable feature with the time elapse is assumed to be, for example, in the same state as a face image registered in storage 101 in advance and can be said to be in a state where the face authentication is likely to succeed (i.e., quality is high). Thus, in a case where the face authentication fails on the face image in the state where the face authentication is likely to succeed, for example, it is likely that no person information on the person of the face image is registered in storage 101. Thus, for example, information processing apparatus 10 is likely to fail again even when performing the re-authentication to the face image having neither the changeable feature nor the less changeable feature with the time elapse.

Thus, information processing apparatus 10 may, for example, set a quality score for the face image having neither the changeable feature nor the less changeable feature with the time elapse as described above lower than the quality score for the face image including the changeable feature.

Meanwhile, at least from the viewpoint that a face image has been correctly imaged although the face image has neither the changeable feature nor the less changeable feature, it is considered that the face authentication is more likely to be successful than on a face image in which a part of the face is masked or changed due to the less changeable feature.

Thus, information processing apparatus 10 may, for example, set a quality score for the face image having neither the changeable feature nor the less changeable feature with the time elapse as described above higher than the quality score for the face image including the less changeable feature.

In the following, as an example, a quality score (or priority level) of a face image having a changeable feature is expressed as "high." On the other hand, a quality score (or priority level) of a face image having a less changeable feature is expressed as "low." In addition, a quality score of a face image having neither a changeable feature nor a less changeable feature is expressed as "medium." In this example, for example, the quality score may be higher in the order of "high," "medium," and "low."

For example, information processing apparatus 10 may classify face authentication-failed persons into three groups respectively corresponding to quality scores of face images ("high," "medium," and "low").

For example, in a face image of a face authentication-failed person, when at least a less changeable feature (e.g., face mask, sunglasses, or the like) is detected, information processing apparatus 10 may set the quality score to "low" regardless of the presence or absence of a changeable feature. Further, information processing apparatus 10 may set the quality score to "high" when, for example, in the face image of the face authentication-failed person, the less changeable feature is not detected while a changeable feature is detected and may set the quality score to "medium" when both of the less changeable and the changeable feature are not detected.

In FIG. 5, information processing apparatus 10 may, for example, sort face authentication-failed persons in each group based on authentication scores (S132). For example, information processing apparatus 10 may sort the face authentication-failed persons in descending order of authentication scores.

For example, in a case where a plurality of persons of which person information is registered in storage 101 is present, information processing apparatus 10 may sort the face authentication-failed persons based on a largest authentication score among authentication scores of face images in the image data acquired from camera 20 and of face images of the registered plurality of persons.

In FIG. 5, information processing apparatus 10 may, for example, determine an order in which the re-authentication is performed (e.g., priority order) for the face authentication-failed persons (S133). Information processing apparatus 10 may determine the priority order of the re-authentication in descending order of quality scores and in descending order of authentication scores in a group of the same quality score, for example.

Figure 6:
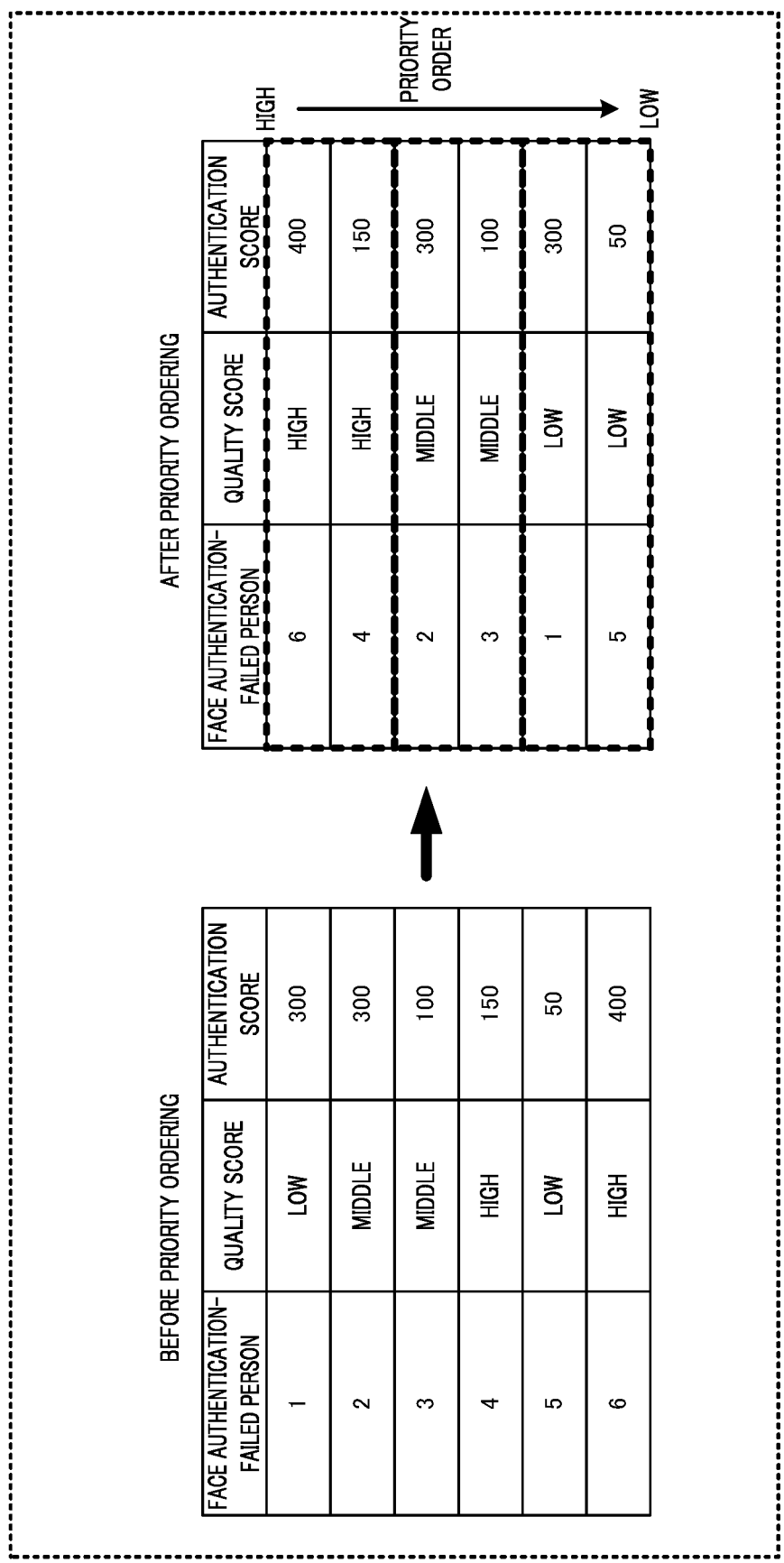
FIG. 6 illustrates an example of the priority order of re-authentication.

FIG. 6 illustrates an example of determining the priority order.

In FIG. 6, as an example, a case will be described where the number of face authentication-failed persons is six (e.g., face authentication-failed person IDs=1 to 6). Incidentally, the number of persons for whom the face authentication has failed is not limited to six and may be another number.

Information processing apparatus 10 determines, for example, the quality score (either "high," "medium," or "low") for each of the six face authentication-failed persons. Information processing apparatus 10 also determines, for example, the authentication score for each of the six face authentication-failed persons. Incidentally, an authentication score may be calculated in, for example, the course of face authentication processing.

Information processing apparatus 10 may classify the six face authentication-failed persons into three groups of "high," "medium," and "low" based on the quality score for each of them, for example. For example, in FIG. 6, face authentication-failed person IDs=4 and 6 are classified into the group of quality score "high," face authentication-failed person IDs=2 and 3 are classified into the group of quality score "medium," and face authentication-failed person IDs=1 and 5 are classified into the group of quality score "low."

Further, information processing apparatus 10 may sort the face authentication-failed persons in descending order of authentication scores, in each of the three groups illustrated in FIG. 6. For example, in FIG. 6, in the group of quality score "high," sorting is performed in the order of face authentication-failed person ID=6 (authentication score: 400) and face authentication-failed person ID=4 (authentication score: 150). Similarly, for example, in FIG. 6, in the group of quality score "middle," the sort is made in the order of face authentication-failed person ID=2 (authentication score: 300) and face authentication-failed person ID=3 (authentication score: 100). Similarly, for example, in FIG. 6, in the group of quality score "low," the sort is made in the order of face authentication-failed person ID=1 (authentication score: 300) and face authentication-failed person ID=5 (authentication score: 50).

Information processing apparatus 10 may then determine the priority order of the re-authentication in descending order of quality scores and in descending order of authentication scores in a group of the same quality score, for example. In FIG. 6, for example, the priority order of the re-authentication may be determined in the order of face authentication-failed person IDs=6, 4, 2, 3, 1, and 5.

For example, information processing apparatus 10 may perform the re-authentication based on the determined priority order of the re-authentication. Further, in the example of FIG. 6, for example, information processing apparatus 10 may control camera 20 to switch imaging regions in the order of face authentication-failed person IDs=6, 4, 2, 3, 1, and 5.

In the manner described above, information processing apparatus 10 controls the order of the re-authentication (priority order) on a plurality of persons for whom the face authentication has failed, based on a quality score and an authentication score for a face image of each of the persons in the captured image data acquired from camera 20.

For example, the control of the order of the re-authentication described above allows information processing apparatus 10 to, for example, perform the re-authentication in the order from a person for whom the authentication is likely to succeed among the face authentication-failed persons. Thus, information processing apparatus 10 can, for example, perform the re-authentication in an earlier order on the person for whom the authentication is likely to succeed in the re-authentication among the plurality of face authentication-failed persons. As a result, information processing apparatus 10 can, for example, perform the re-authentication while the person for whom the authentication is likely to succeed in the re-authentication is present in the authentication area (i.e., prior to passing through authentication area).

Further, information processing apparatus 10, for example, delays an order of the re-authentication on a person for whom the authentication is less likely to succeed among the plurality of face authentication-failed persons. This makes it possible to, for example, in information processing apparatus 10, suppress a delay in the re-authentication processing for other face authentication-failed persons caused by the re-authentication processing for the person for whom the authentication is less likely to succeed.

Further, information processing apparatus 10 can perform the re-authentication preferentially on a person for whom the re-authentication is likely to succeed by grouping with the quality score and then sorting by the authentication score. That is, a person with a high quality score is a person for whom the authentication has most likely failed due to a temporary cause, so that he/she is a person for whom the cause of the failure is likely to be resolved by performing the re-authentication. Ranking such a person high in the sorting can lower the priority order of performing the re-authentication on a person for whom the authentication has failed due to a difficult-to-resolve cause and thus increase a chance of successful re-authentication.

In the manner described above, for example, the number of persons for whom the face authentication by authentication system 1 is successful can be increased in an environment in which people move, which can improve authentication efficiency in authentication system 1.

(Variation 1)

In the embodiment described above, a case has been described where the face authentication-failed persons are sorted, after grouping by the quality score, in the order of authentication score in the group (hereinafter referred to as "Priority Order Determination Method 1"), but a determination method for the priority order is not limited to this.

In one example, information processing apparatus 10 may group face authentication-failed persons into any of a plurality of groups based on the authentication score and sort the face authentication-failed persons in the order of quality score in the group (hereinafter referred to as "Priority Order Determination Method 2").

Here, a person whose quality score is "medium" and whose authentication score is lower may be a nonregistered person, and for whom the authentication is likely to fail again in the re-authentication, for example. For example, since the quality score for such a person is "medium," in Priority Order Determination Method 1, the priority order of the re-authentication tends to be set near a middle of all the face authentication-failed persons. On the other hand, in Priority Order Determination Method 2, since grouping is performed based on the authentication score, a person with an extremely low authentication score is set to the group with a low priority order of the re-authentication. Therefore, in Priority Order Determination Method 2, information processing apparatus 10 can set the priority order of the re-authentication with respect to, for example, a person with a "medium" quality score but a low authentication score. Similarly, the priority order of the re-authentication can be set lower with respect to a person with a "high" quality score but a low authentication score. That is, with this setting, the order of the re-authentication is more likely to be delayed for a person with a low authentication score regardless of the quality score, which allows information processing apparatus 10 to perform the re-authentication preferentially on other face authentication-failed persons, and thus, the authentication efficiency can be improved.

Priority Order Determination Methods 1 and 2 may be dynamically switched. For example, in Determination Method 1, in a case where the authentication processing for a person with a "medium" quality score but a low authentication score continues in time series (e.g., for specified period of time or specified number of times), information processing apparatus 10 may switch from Determination Method 1 to Determination Method 2.

Further, Priority Order Determination Method 2 may be applied when the authentication processing is performed in an environment (or area) visited by more people different from those registered in the person information of storage 101 (e.g., nonregistered persons), such as an event venue. In such an environment, there may be more persons each with a "medium" quality score but a low authentication score. Accordingly, information processing apparatus 10, for example, can set the priority order of the re-authentication for a person registered in storage 101 (i.e., person likely to have high authentication score) to be higher and set the priority order of the authentication for a person nonregistered in storage 101 (i.e., person likely to have low authentication score) to be lower, based on Determination Method 2. With this setting, the re-authentication processing is performed preferentially on the person registered in storage 101, which can improve the authentication efficiency.

Further, Priority Order Determination Methods 1 and 2 may be switched by a user's selection. Thus, either of the determination methods can be set according to an environment favorable for the determination method, which can improve the authentication efficiency.

(Variation 2)

In the embodiment described above, a case has been described where information processing apparatus 10 determines a priority order of the re-authentication with reference to, for example, a quality score and an authentication score individually, but the present disclosure is not limited to this case.

Information processing apparatus 10 may determine the priority order of the re-authentication based on, for example, a score with reference to both the quality score and the authentication score (e.g., referred to as overall score or overall evaluation).

For example, with respect to each of a plurality of face authentication-failed persons, information processing apparatus 10 may perform weighting for an authentication score for an attribute of a quality score (e.g., facial expression, facial orientation, face mask, sunglasses, and the like). Information processing apparatus 10 may then, for example, set the authentication score after weighting as a priority level of the re-authentication and determine the priority order of the re-authentication in descending order of priority levels.

For example, weighting for a changeable attribute such as a facial expression, a facial orientation may be set to be higher than weighting for a less changeable attribute such as sunglasses or a face mask.

For example, information processing apparatus 10 may set a positive value for a weighting value for a face image having a feature that is likely to change with time. This increases the authentication score (or priority level) after the weighting for the face authentication-failed person having the changeable feature (e.g., easily authenticated person), and thus, the priority order of the re-authentication can be raised. Further, a value may be set different for each of a plurality of features that are likely to change with time. For example, the possibility of someone keeping the same expression for a long time is less than the possibility of someone keeping his or her face in a direction other than the front for a long time; accordingly, the weighting value corresponding to the attribute of the expression may be set to +50, and the weighting value corresponding to the attribute of the facial orientation different from the front may be set to +30. Note that, each of the weighting values described above is merely an example and is not limited to these.

On the other hand, for example, information processing apparatus 10 may set for a negative value for a weighting value for a face image having a feature that is less likely to change with time. This reduces the authentication score (or priority level) after the weighting for the face authentication-failed person having the less changeable feature (e.g., person hard to be authenticated), and thus, the priority order of the re-authentication can be lowered. Further, a value may be set different for each of a plurality of features that are less likely to change with time. For these values, for example, the less changeable feature is, the lower value may be set. As a result, the authentication score after the weighting becomes lower for a person having the less changeable feature, which can lower the priority order of the re-authentication. In one example, the weighting value corresponding to the attribute of sunglasses that are removable may be set to −50, and the weighting value corresponding to the attribute of a beard that is difficult to remove may be set to −100. Note that, each of the weighting values described above is merely an example and is not limited to these.

Figure 7:
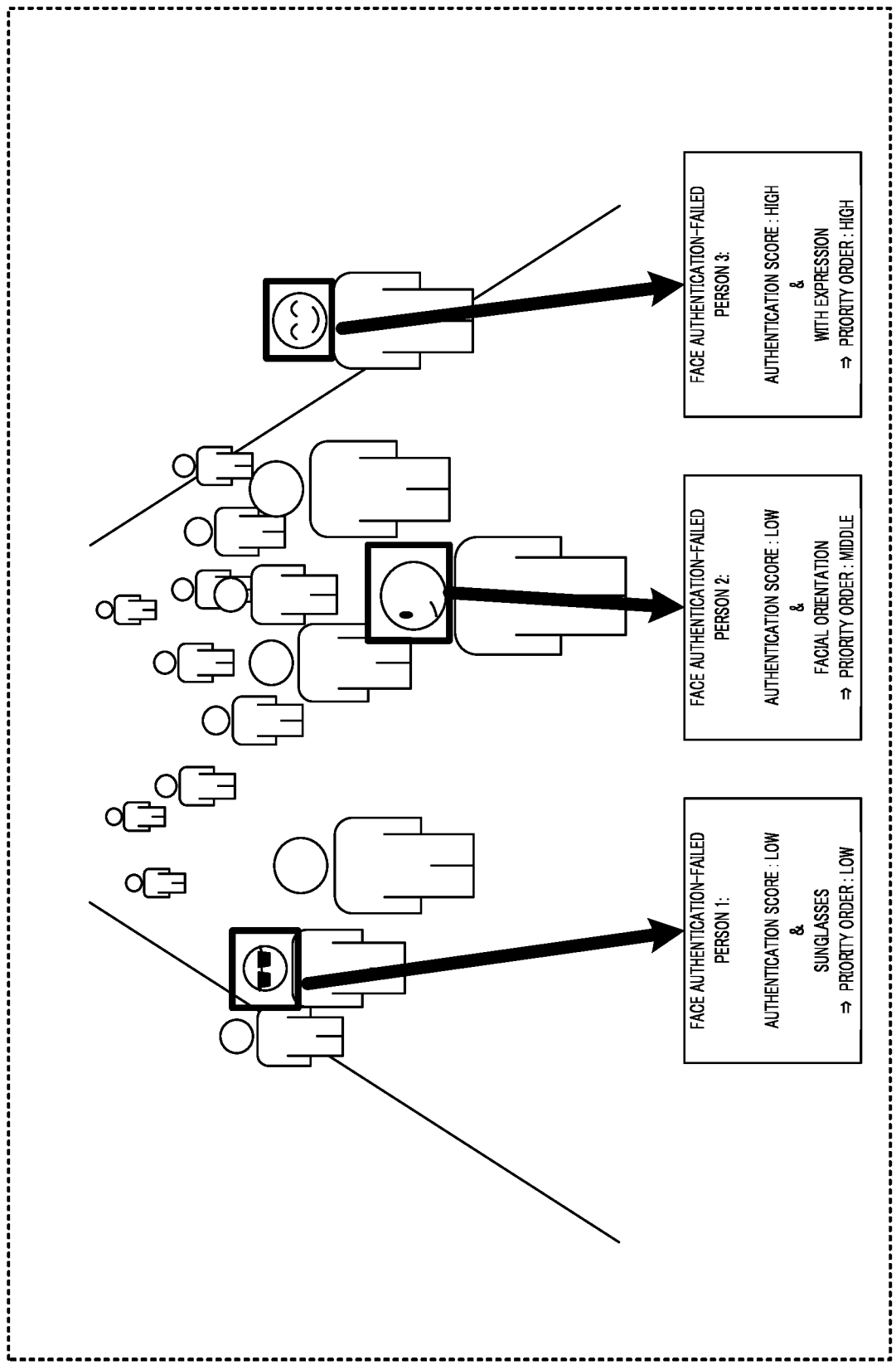
FIG. 7 illustrates an example of weighting for an authentication score.

FIG. 7 illustrates an example of weighting for an authentication score by a quality score. In FIG. 7, for example, an authentication score is simply expressed by two values of a high value (denoted as "high") and a low value (denoted as "low").

In FIG. 7, for example, the face image of face authentication-failed person 3 has a "high" authentication score and a feature with the expression. In this case, for example, the priority order of the face authentication-failed person 3 can be set higher by weighting for the authentication score of face authentication-failed person 3 as a positive value.

Meanwhile, in FIG. 7, for example, each face image of face authentication-failed person 1 and face authentication-failed person 2 has "low" authentication score. Further, in FIG. 7, for example, the weighting is performed for the authentication score of face authentication-failed person 1 having a feature of the sunglasses as a negative value, whereas the weighting is performed for the authentication score of face authentication-failed person 2 having a feature of the facial orientation as a positive value. Therefore, the priority order of face authentication-failed person 2 is set higher than the priority order of face authentication-failed person 1.

Thus, setting a weighting value for each of a plurality of attributes (features) corresponding to a quality score allows information processing apparatus 10 to determine more finely the easiness of face authentication on a face authentication-failed person, as compared with the embodiment described above.

In addition, in Variation 2, for example, when a quality score is "medium" (in the case of person having neither changeable feature nor less change able feature), weighting for an authentication score is less likely to be performed. For this reason, for example, with respect to a person with a "medium" quality score but a low authentication score (e.g., person nonregistered in person information of storage 101), the priority order of the re-authentication is likely to be set lower as compared with a person with a "high" quality score. Thus, for example, information processing apparatus 10, for example, can set the priority order of the authentication for a person registered in storage 101 (i.e., person likely to have high authentication score) to be higher and set the priority order of the authentication for a person nonregistered in storage 101 (i.e., person likely to have low authentication score) to be lower, which can improve authentication efficiency in authentication system 1.

(Variation 3)

Information processing apparatus 10 may, for example, determine not to perform the re-authentication on a person with a low priority order of the re-authentication (e.g., person with priority order lower than threshold value). Alternatively, information processing apparatus 10 may, for example, determine not to perform the re-authentication on a person with a quality score equal to or less than a threshold value (e.g., "low"). Since the re-authentication on such a person is likely to fail, information processing apparatus 10 reduces the number of re-authentication targets and increases a chance of the re-authentication on other people, and thus, the authentication efficiency can be improved.

(Variation 4)

Information processing apparatus 10 may, for example, calculate a quality score based on image data acquired by the wide-field camera of camera 20 and may calculate an authentication score based on image data acquired by the PTZ camera. For example, since an image quality of PTZ camera is better as compared with the wide-field camera, the accuracy in face authentication can be improved. On the other hand, even when an image quality of the wide-field camera is poor as compared with the PTZ camera, information processing apparatus 10 can determine a feature of a person (e.g., attribute of quality score), based on the image data acquired by the wide-field camera, for example.

The variations have been each described, thus far.

Note that, camera 20 is not limited to a wide-field camera and a PTZ camera and may be a camera controllable by information processing apparatus 10. For example, camera 20 may be a camera mounted on a drone or a robot.

In addition, the quality score is not limited to three types (high, medium, and low) and may be two, four or more. For example, in the embodiment described above, a higher quality score may be associated with a feature which relates to a removable object, such as a face mask, sunglasses, or a hat, than a feature which relates to a difficult-to-remove object, such as a beard or a cosmetic, of the features that are less likely to change with time elapse.

Moreover, classification between the feature that is likely to change with time and the feature that is less likely to change with time is not limited to the aspect of the embodiment described above. In one example, it may be varied depending on an environment or the like for performing face authentication. Specifically, when performing the face authentication indoors, sunglasses and a hat are rarely worn continuously and may thus be classified into the feature that is likely to change with time. Similarly, since it is unlikely that a hairstyle changes greatly indoors with little influence of wind or the like, hairs or the like may be classified into the feature that is less likely to change with time. In order to perform the classification flexibly, a user of information processing apparatus 10 may optionally specify which feature is included in the less changeable feature with the time elapse and which feature is included in the changeable feature with the time elapse. Alternatively, information processing apparatus 10 may automatically perform the classification, based on information on environment in which the face authentication is performed (e.g., geographical location, time, brightness, wind intensity, and the like).

Further, in the embodiment described above, a quality score has been calculated using an identification model that is learned for each attribute, but the present disclosure is not limited to this. In one example, information processing apparatus 10 may calculate an authentication score of a face image for each facial part (eyes, nose, mouth, and the like), estimate, from the result, which feature the face image has, and thereby calculate a quality score. For example, in a case where the authentication score of the eyes is extremely lower than those of other parts, it can be estimated that sunglasses or the like is worn. In addition, in a case where an authentication score of the mouth is extremely lower than those of other parts, it can be estimated that a face mask or the like is worn.

Meanwhile, a quality score may also be, for example, a value (e.g., 0 or 1) indicating the presence or absence of a corresponding feature (e.g., expression, face mask, sunglass, and the like) or may be a value indicating a degree of a corresponding feature (e.g., facial orientation, lighting, and the like). By way of example, in the feature of a facial orientation, the closer to the front the facial orientation of a person is, the higher quality score may be set. For example, when a quality score indicates the degree of feature, information processing apparatus 10 may determine the quality score based on a comparison result between the degree of feature and a threshold value. Alternatively, information processing apparatus 10, in variation 2, for example, may perform weighting for an authentication score, based on the degree of feature.

Further, a feature of a quality score is not limited to the example described above (e.g., face mask, sunglasses, expression, or facial orientation) and may be another feature related to the ease of face authentication.

Further, in the embodiment described above, a case has been described where information processing apparatus 10 determines a priority order of the re-authentication based on a quality score and an authentication score, but the present disclosure is not limited to this case. Information processing apparatus 10 may determine the priority order of the re-authentication based on, for example, a quality score (not based on authentication score). A person with a high quality score is a person for whom the authentication has most likely failed due to a temporary cause, so that he/she is a person for whom the cause is likely to be resolved by performing the re-authentication, regardless of the current authentication score. Therefore, evaluating the quality score can increase the priority order of the re-authentication on a person for whom the re-authentication is most likely to succeed, without considering the current authentication score.

Further, information processing apparatus 10 may, for example, determine the priority order of the re-authentication based on an authentication score (not based on quality score).

Although the embodiments according to the present disclosure have been described above in detail with reference to the drawings, the function of information processing system 1 described above can be implemented by a computer program.

Figure 8:
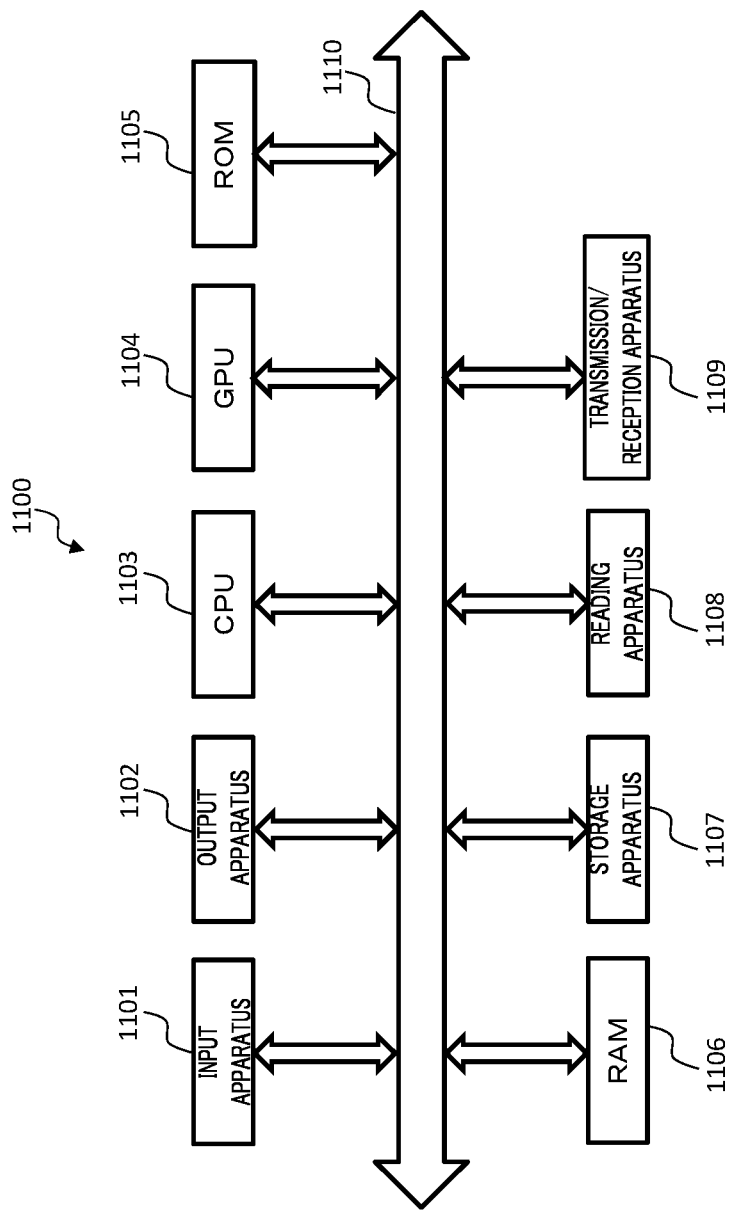
FIG. 8 illustrates an exemplary hardware configuration of a computer.

FIG. 8 illustrates a hardware configuration of a computer in which the functions of the apparatuses are implemented by a program. This computer 1100 includes: input apparatus 1101 such as a keyboard, mouse, and/or touch pad; output apparatus 1102 such as a display or speaker; Central Processing Unit (CPU) 1103; Graphics Processing Unit (GPU) 1104; Read Only Memory (ROM) 1105; Random Access Memory (RAM) 1106; storage apparatus 1107 such as a hard disk apparatus or a Solid State Drive (SSD); reading apparatus 1108 for reading information from recording medium such as a Digital Versatile Disk Read Only Memory (DVD-ROM) or a Universal Serial Bus (USB) memory; and transmission/reception apparatus 1109 for communicating over a network, which are connected to one another by bus 1110.

Reading apparatus 1108 reads a program for implementing the functions of the respective apparatuses from the recording medium in which the program is recorded, and stores the program in storage apparatus 1107. Alternatively, transmission/reception apparatus 1109 communicates with a server apparatus connected to the network to download, from the server apparatus, the aforementioned program for implementing the functions of the respective apparatuses and store the program in storage apparatus 1107.

Then, CPU 1103 copies the program stored in storage apparatus 1107 to RAM 1106, and sequentially reads instructions included in the program from RAM 1106, so as to implement the functions of the respective apparatuses.

Each functional block used in the description of each embodiment described above is typically implemented as a Large Scale Integration (LSI), which is an integrated circuit. The LSI may be individually formed as chips, or may be formed as one chip so as to include a part or all of the functional blocks. The LSI herein may be referred to as an Integrated Circuit (IC), a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

In addition, in recent years, in Internet of Things (IoT) technology, Cyber Physical Systems (CPS), which is a new concept of creating new added value by information collaboration between physical space and cyberspace, has been attracting attention. Also in the above embodiments, this CPS concept can be adopted.

That is, as a basic configuration of the CPS, for example, an edge server disposed in the physical space and a cloud server disposed in the cyberspace can be connected via a network, and processing can be distributedly performed by processors mounted on both of the servers. Here, it is preferable that processed data generated in the edge server or the cloud server be generated on a standardized platform, and by using such a standardized platform, it is possible to improve efficiency in building a system including various sensor groups and/or IoT application software.

In the above-described embodiment, for example, the edge server may be placed at an installation position of camera 20 and perform part of the authentication processing, and the cloud server may perform the remaining of the authentication processing by using the data received from the edge server over the network, for example. Moreover, in the above-described embodiment, for example, the edge server may perform processing related to the image data acquired from camera 20, and the cloud server may perform the authentication processing.

An information processing apparatus according to an exemplary embodiment of the present disclosure includes: authentication circuitry, which, in operation, performs authentication on a person based on a face image of the person in captured image data; and control circuitry, which, in operation, controls an order of re-authentication on a plurality of persons for whom the authentication has failed, based on information on an attribute related to a time change of the face image.

In an exemplary embodiment of the present disclosure, the information on the attribute is based on a change in a feature according to time elapse of the face image.

In an exemplary embodiment of the present disclosure, the authentication circuitry performs the authentication based on a degree of similarity between the captured image data and registered image data of a person registered in advance, and the control circuitry determines the order based on the information on the attribute and information on the degree of similarity.

In an exemplary embodiment of the present disclosure, the control circuitry determines the order by classifying the plurality of persons into a plurality of groups based on one of the information on the attribute and the information on the degree of similarity and by sorting persons in the plurality of groups based on the other of the information on the attribute and the information on the degree of similarity.

In an exemplary embodiment of the present disclosure, the control circuitry performs, for the plurality of persons, weighting for the information on the degree of similarity based on the information on the attribute and determines the order based on the information on the degree of similarity after the weighting.

In an exemplary embodiment of the present disclosure, the control circuitry sets a weight for the information on the attribute for a first face image including a first feature that is likely to change with the time elapse to be higher than a weight for the information on the attribute for a second face image including a second feature that is less likely to change with the time elapse.

In an exemplary embodiment of the present disclosure, the control circuitry sets a weight for the information on the attribute for a face image including neither the first feature nor the second feature to be higher than a weight for the information on the attribute for the second face image and lower than a weight for the information on the attribute for the first face image.

In an exemplary embodiment of the present disclosure, the control circuitry determines not to perform re-authentication on a person with an index equal to or less than a threshold value, the index being based on the change in the feature according to the time elapse of the face image.

In an exemplary embodiment of the present disclosure, the control circuitry controls an operation of a camera that captures the captured image data, based on a control result for the re-authentication.

An information processing method according to an exemplary embodiment of the present disclosure includes: performing, by an information processing apparatus, authentication on a person based on a face image of the person in captured image data; and controlling, by the information processing apparatus, an order of re-authentication on a plurality of persons for whom the authentication has failed, based on information on an attribute related to a time change of the face image.

A program according to an exemplary embodiment of the present disclosure causes an information processing apparatus to perform processing comprising: performing authentication on a person based on a face image of the person in captured image data; and controlling an order of re-authentication on a plurality of persons for whom the authentication has failed, based on information on an attribute related to a time change of the face image.

The disclosure of Japanese Patent Application No. 2020-094284, filed on May 29, 2020, including the specification, drawings and abstract, is incorporated herein by reference in its entirety.

INDUSTRIAL APPLICABILITY

An exemplary embodiment of the present disclosure is useful for authentication systems.

REFERENCE SIGNS LIST

1 Authentication system
10 Information processing apparatus
20 Camera
101 Storage
102 Authenticator
103 Controller

The invention claimed is:

1. An information processing apparatus, comprising:
authentication circuitry, which, in operation, performs authentication on a person based on a face image of the person in captured image data; and
control circuitry, which, in operation, controls an order of re-authentication on a plurality of persons for whom the authentication has failed, based on information on an attribute related to a time change of the face image,
wherein the information on the attribute is determined based on whether the face image of each of the plurality of persons includes at least one of a first feature or a second feature,
the first feature is a preset feature which is likely to change with a time elapse, and the second feature is a preset feature which is less likely to change with the time elapse, and
the control circuitry sets a weight for the information on the attribute for a first face image including the first feature to be higher than a weight for the information on the attribute for a second face image including the second feature.

2. The information processing apparatus according to claim 1, wherein:
the authentication circuitry performs the authentication based on a degree of similarity between the captured image data and registered image data of a person registered in advance, and
the control circuitry determines the order based on the information on the attribute and information on the degree of similarity.

3. The information processing apparatus according to claim 2, wherein the control circuitry determines the order by classifying the plurality of persons into a plurality of groups based on one of the information on the attribute and the information on the degree of similarity and by sorting persons in the plurality of groups based on the other of the information on the attribute and the information on the degree of similarity.

4. The information processing apparatus according to claim 2, wherein the control circuitry performs, for the plurality of persons, weighting for the information on the degree of similarity based on the information on the attribute and determines the order based on the information on the degree of similarity after the weighting.

5. The information processing apparatus according to claim 1, wherein the control circuitry sets a weight for the information on the attribute for a face image including neither the first feature nor the second feature to be higher than a weight for the information on the attribute for the second face image and lower than a weight for the information on the attribute for the first face image.

6. The information processing apparatus according to claim 1, wherein the control circuitry determines not to perform re-authentication on a person with an index equal to or less than a threshold value, the index being based on the change in the feature according to the time elapse of the face image.

7. The information processing apparatus according to claim 1, wherein the control circuitry controls an operation of a camera that captures the captured image data, based on a control result for the re-authentication.

8. An information processing method, comprising:
performing, by an information processing apparatus, authentication on a person based on a face image of the person in captured image data; and
controlling, by the information processing apparatus, an order of re-authentication on a plurality of persons for whom the authentication has failed, based on information on an attribute related to a time change of the face image,
wherein the information on the attribute is determined based on whether the face image of each of the plurality of persons includes at least one of a first feature or a second feature,
the first feature is a preset feature which is likely to change with a time elapse, and the second feature is a preset feature which is less likely to change with the time elapse, and
in the controlling, a weight for the information on the attribute for a first face image including the first feature is set to be higher than a weight for the information on the attribute for a second face image including the second feature.

9. A program, stored on a non-transitory storage medium, causing an information processing apparatus to perform processing comprising:
performing authentication on a person based on a face image of the person in captured image data; and
controlling an order of re-authentication on a plurality of persons for whom the authentication has failed, based on information on an attribute related to a time change of the face image,
wherein the information on the attribute is determined based on whether the face image of each of the plurality of persons includes at least one of a first feature or a second feature,
the first feature is a preset feature which is likely to change with a time elapse, and the second feature is a preset feature which is less likely to change with the time elapse, and
in the controlling, a weight for the information on the attribute for a first face image including the first feature is set to be higher than a weight for the information on the attribute for a second face image including the second feature.

* * * * *